May 7, 1935.　　　　　J. G. MACLAREN　　　　2,000,400
PNEUMATIC DISPATCH CARRIER
Filed Nov. 11, 1931
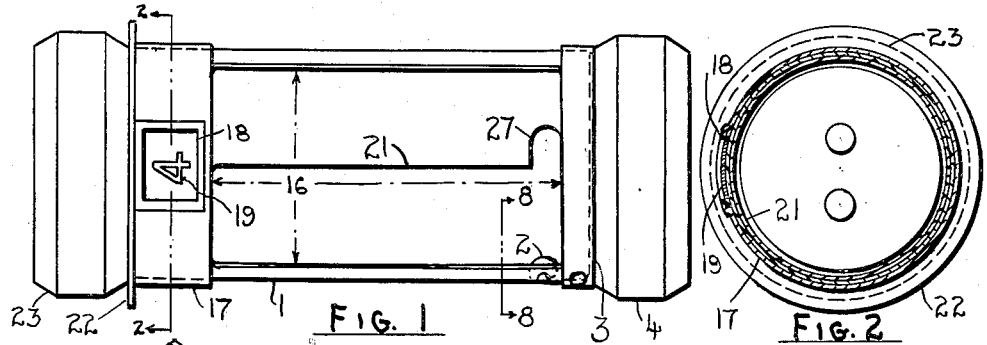
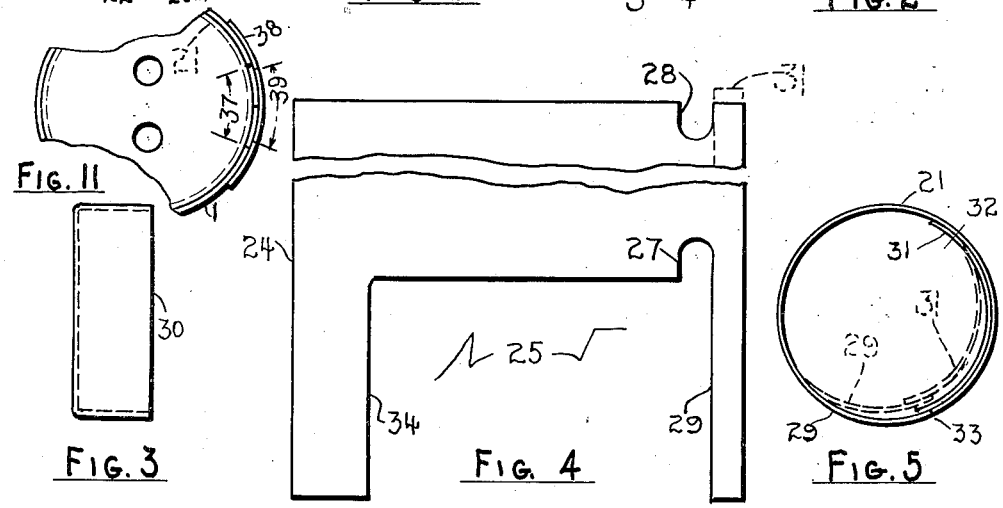
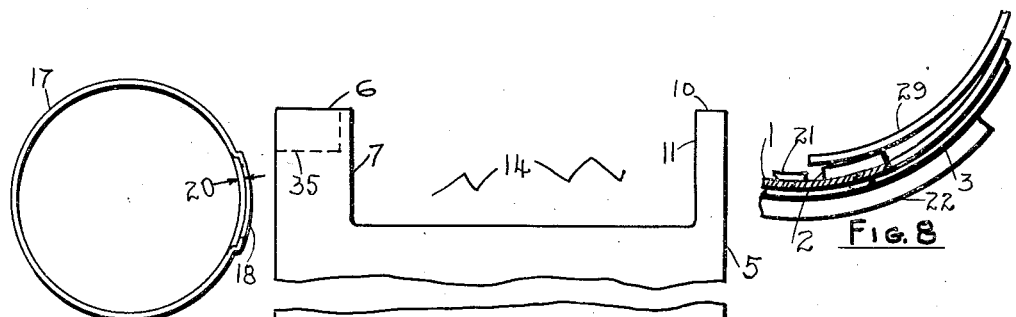
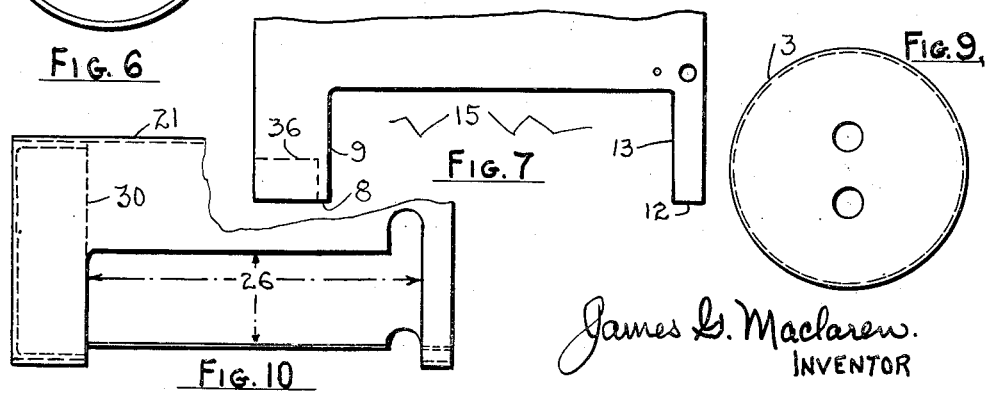
James G. Maclaren.
INVENTOR Patented May 7, 1935

2,000,400

UNITED STATES PATENT OFFICE 2,000,400

PNEUMATIC DISPATCH CARRIER

James G. Maclaren, San Francisco, Calif.

Application November 11, 1931, Serial No. 574,299

10 Claims. (Cl. 243—34)

This invention relates to carriers of the type primarily meant for the handling of cash and charge records in department stores by means of pneumatic dispatch systems.

Carriers of this type comprise an inner and an outer shell, each shell having one closed end to which a felt buffer head is attached. These shells telescope one within the other and are rotatable in relation to each other. The rotating and endwise movements of the shells are limited by a suitable stop.

In the side of each shell is an elongated opening. These openings may be brought into registry with each other for access to the interior of the carrier and are rotated out of registry to close the carrier.

To facilitate the assembly and repair of these carriers, the change of markers and the separation of the shells for the insertion of articles too long for the side openings, means are provided to disengage the shells to permit of their being pushed together, or pulled apart endwise. Carriers with this feature are known as take-apart carriers.

This form of carrier has heretofore been made of drawn brass, requiring expensive drawing equipment and tool set-ups, making it necessary for commercial reasons to limit the carriers to one or two lengths and stock them in quantities.

The present invention provides a carrier that may be made from sheet metal or tubing, in any desired length and in reasonable quantities with the equipment available in the average tube system manufacturing shop.

This carrier can be made of any desired material, but I prefer rust resisting steel, as it can then be assembled by spot welding and be a carrier not easily dented.

A preferred form of the invention is shown in the drawing;

Fig. 1 is a side elevation of the complete carrier and shows the shells rotated to a half open position.

Fig. 2 is a cross sectional view showing the position of the marker in relation to the carrier shells.

Fig. 3 illustrates a cap that may be used to close an end of the inner shell.

Fig. 4 shows a developed sheet to be rolled into a cylinder for the inner shell.

Fig. 5 illustrates how the diameter of the inner shell end may be reduced to clear the stop and permit the shells to be moved endwise in relation to each other.

Fig. 6 shows a hoop having a window space in which a marker may be placed.

Fig. 7 shows a development of the outer shell.

Fig. 8 is an enlarged view showing the open end of the inner shell bent in to clear a stop pin.

Fig. 9 shows a cup used to cover one end of the outer shell.

Fig. 10 shows an assembly of the inner shell.

Fig. 11 is an end view of an outer shell having a space within the shell wall for a marker covered by a band encircling the shell and suitable for use instead of the hoop in Fig. 6.

Referring to Fig. 1, the outer shell is designated by the numeral 1. This shell is shown with a circular stop pin 2 projecting inward from the wall of the outer shell 1. One end of the outer shell 1 is covered and shaped by the cap 3 (Fig. 9) attached to the shell. Secured to the cap 3 is a felt buffer head 4 such as is commonly used for this class of carriers. The outer shell 1 may be made from a sheet 5 cut as indicated in Fig. 7 and then formed into a cylinder with the end 6 of the leg 7 butting against or near the end 8 of leg 9. Also the end 10 of leg 11 will be close to the end 12 of the leg 13.

The cut out portions 14 and 15 in the sheet 5, when it is formed into a cylinder, will provide an access opening as indicated by the dimensions 16 in Fig. 1.

The open end of the outer shell 1 may be kept in shape by a hoop 17, preferably rigidly secured to the shell. This hoop 17 has an embossed opening or window 18 for holding a marker 19, usually a rectangular printed piece of thin celluloid to indicate the sub-station owning the carrier.

The outer edge of the window 18 in alignment with the end of the outer shell 1 is left open, as indicated by the dimension 20 in Fig. 6, to permit a marker to be slipped into or out of the window 18 when the carrier shells 1 and 21 are apart. When the carrier is assembled, the marker 19 is retained by the three embossed sides of the window 18 that contact with it and the leather washer 22 and buffer head 23 that are attached to the inner shell 21.

In Fig. 11 is shown an alternate arrangement providing a space 37, for the marker, within the wall of the outer shell and covered by a band 38. This band 38 has a window opening 39 like the opening 18 in Fig. 1, except that it is not necessary to emboss the edge of the opening to provide a space for the marker.

The marker space 37, Fig. 11, is made by cutting out the corners 35 and 36 indicated by dotted lines in Fig. 7. Then when the ends 6 and 8 are brought together and covered by the band 38, there will be a marker space 37, Fig. 11, with an access opening at the end of the outer shell 1.

It will be noted I have shown a hoop 17 in Figs. 1 and 6 to hold the outer shell in shape and provide a window over the marker, while in Fig. 11 I show a band partially encircling the shell. Although I prefer a hoop or band that completely encircles the outer shell 1, either form may be used.

The inner shell 21, Fig. 10, may be formed from the sheet 24 shown in Fig. 4. The cut-out portion 25 provides the access opening 26 corresponding in size and located to register with, or cover, the access opening 16 in the outer shell 1. After forming, one end of the inner shell is closed by attaching to it the cup 30 shown in Fig. 3.

The inner shell 21 may be positioned in relation to the outer shell 1 by means of the stop 2 on the outer shell and the slots 27 and 28 in the inner shell.

When the carrier is closed the round end of the slot 27 is against the stop 2. When open wide, the round end of the slot 28 is against the stop 2.

Endwise outward movement of the shells is normally prevented by contact of the leg 29, Fig. 4, with the stop 2. By bending this leg 29 inward to contract the end diameter of the inner shell, the leg 29 will be inside of the stop 2 as shown in Fig. 8, and the carrier may be pulled apart or assembled without dismembering any of the fixed parts.

In Fig. 5 is shown an end view of an inner shell having a spring or stiffener 31, no wider than the leg 29, Fig. 4, and attached near one end, as at 32, to the inside of the inner shell, in alignment with the leg 29, and having one end extending to lap over the joint 33. This stiffener 31 adds to the force required to contract the shell end, and while not necessary for operating the carrier, it does convey an assurance that the carrier will not accidentally come apart in service.

Although I have shown, in Fig. 4, an inner shell sheet having but one cut out portion 25 and one pair of legs 29 and 34; obviously this sheet could have two cut out portions and two pairs of legs as in Fig. 7. This would provide two collapsible legs instead of the single one shown in the drawing.

It is to be understood that while preferred embodiments of this invention have been shown herein by way of example, various changes in the proportions and arrangement of parts may be made if desired, and that equivalent parts may be substituted for those shown and described herein, and that some parts may be omitted without departing from the invention.

I claim:

1. A pneumatic dispatch carrier having telescoping shells free to rotate one within the other, a stop member on one shell and engaging with the other to prevent relative endwise movement of the shells and limit the relative rotation of the shells, one of the shells being of changeable diameter to permit disengagement from the stop and separation of the shells.

2. A pneumatic dispatch carrier having telescoping shells, a stop member on one shell and engaging with the other shell to prevent relative endwise movement of the shells, and a joint in one shell that may be opened to clear the stop member without disturbing any other member of the carrier structure and permit endwise movement of the shell past the stop member.

3. A pneumatic dispatch carrier having two telescoping shells, a stop member projecting inwardly from the outer shell and in contact with an abutment member of the inner shell to normally prevent relative endwise movement of the shells, and a joint in said abutment member to be depressed beyond the stop member to permit separation of the shells without disturbing any other part of the carrier structure.

4. A pneumatic dispatch carrier having telescoping shells free to rotate one within the other, means operative to prevent the separation and limit the relative rotation of the shells, one of the shells being of changeable diameter to permit disengagement from said separation preventing means, and a stiffening member attached to the inner shell tending to hold the shell to normal diameter.

5. A pneumatic dispatch carrier of the takeapart type having two telescoping shells, a means operative to both prevent the separation and limit the rotation of said shells, one of the shells being of changeable diameter to permit disengagement from the said separation and rotation preventing means.

6. A pneumatic dispatch carrier of the takeapart type having two telescoping shells, a means operative to prevent the separation and limit the rotation of said shells, one of the shells being of changeable diameter to permit disengagement from the said separation and rotation preventing means, a marker space within or on the wall of the outer shell, means for preventing the removal of the marker when the carrier is assembled, and an access opening in the thin edge of the marker space through which markers may be inserted only when the shells are either partly or entirely separated.

7. A pneumatic dispatch carrier having two telescoping shells, a stop member projecting inward from the outer shell and in contact with an abutment member of the inner shell to normally prevent relative endwise movement of the shells, a joint in said abutment member allowing said abutment member to be depressed beyond the stop member to permit separation of the shells, a band encircling the outer shell and having a marker containing window space, and an opening for the insertion of a marker into the window space, said opening to be accessible only when the shells are separated.

8. A pneumatic dispatch carrier having an outer and an inner shell rotatable in relation to each other, the outer shell retained in shape by a band around one end and a cap attached to the opposite end, the inner shell secured in shape by a cup attached to one end, a stop member normally preventing the separation of the shells, and means for reducing the diameter of the inner shell to permit its removal past the stop member without disturbing any other part of the carrier structure.

9. A pneumatic dispatch carrier having an outer and inner shell rotatable in relation to each other, the outer shell retained in shape by a band around one end, said band having an embossed window space to hold a removable marker between the band and the shell, an access opening to the window space to permit the removal of a marker, the inner shell retained in shape by a cup secured in one end, a stop member normally preventing the separation of the shells, and means for reducing the diameter of the inner shell to permit its removal past the stop member without disturbing any other part of the carrier structure.

10. A pneumatic dispatch carrier having an inner and an outer shell rotatable in relation to each other, the inner shell retained in shape by a cup secured in one end, the outer shell retained in shape by a band around one end and having a space for a marker under the band, a window over said space and in said band, an access opening to said space, a stop member normally preventing the separation of the shells, and means for reducing the diameter of the inner shell to permit its removal past the stop member without disturbing any other part of the carrier structure.

JAMES G. MACLAREN.